United States Patent Office.

GIACINTO BARTOLOMEI, OF CHICAGO, ILLINOIS.

Letters Patent No. 95,071, dated September 21, 1869.

IMPROVED COMPOSITION FOR ROOFING AND PAVING.

The Schedule referred to in these Letters Patent and making part of the same.

*To all whom it may concern:*

Be it known that I, GIACINTO BARTOLOMEI, of the city of Chicago, county of Cook, and State of Illinois, have invented a certain Composition for Roofing and Paving.

The nature of my invention consists in mixing, in certain proportions, the different ingredients—stone-flour, sand, and coal-tar—so as to make a composition which has the strength and durability of stone, to be used for the purpose of roofing, paving, and other purposes.

Of these ingredients, the stone-flour consists of limestone, pulverized or ground without burning or calcining, as burning it will make it into lime, which spoils it for the purpose I use it for.

The sand can be of any quality, but I much prefer that which is fine, as it will mix better.

The coal-tar I use is the common article of tar known under that name.

These ingredients I use in the following proportions, viz:

Stone-flour, three barrels;
Sand, one and one-half barrel; and
Coal-tar, one barrel.

After the articles named are arranged in the above proportion, in order to mix them, I first place the coal-tar in a kettle, or any suitable vessel that can be used, for the purpose of boiling it. After the coal-tar has boiled about two hours, I then take the stone-flour and sand, already mixed, and stir them into the boiling coal-tar, until all three of the ingredients are thoroughly mixed together. I then boil the mixture about four hours. This, when allowed to cool, will form a substance as strong and compact as stone, and very nearly as hard as iron, and, when placed on a roof, will be found to resist a vast amount of wear.

If it is found that this proportion makes a harder substance than is required, it will be readily seen that it can be made softer by varying the proportion of stone-flour and sand—that is, making them of less quantity; but, for common use, the proportions here given are correct.

Having thus fully described my invention,

What I claim as new, is as follows:

The manufacture or preparation of a compound, herein described, of the ingredients, in the proportions, and for the purposes set forth.

GIACINTO BARTOLOMEI.

Witnesses:
E. A. WEST,
L. L. BOND.